United States Patent [19]

Lewakowski

[11] 3,738,342
[45] June 12, 1973

[54] ENGINE EXHAUST RECIRCULATION
[76] Inventor: John Janusz Lewakowski, 3346 Winterfield, Warren, Mich. 48892
[22] Filed: Dec. 27, 1971
[21] Appl. No.: 212,584

[52] U.S. Cl. .......................................... 123/119 A
[51] Int. Cl. ............................................ F02m 25/00
[58] Field of Search .............................. 123/119 A

[56] References Cited
UNITED STATES PATENTS
2,543,194   2/1951   Paris ............................. 123/119 A
3,646,923   3/1972   Sarto ............................ 123/119 A
2,154,417   4/1939   Anderson ..................... 123/119 A
2,722,927   11/1955  Cornelius ..................... 123/119 A Primary Examiner—Al Lawrence Smith
Assistant Examiner—Dennis Toth
Attorney—Jay C. Taylor

[57] ABSTRACT

Automobile exhaust gases are recycled through the engine via a bypass duct connecting a cool portion of the exhaust system with the fuel-air inlet induction conduit. A servo valve is controlled by the pressure at a vacuum sensing port opening into the inlet induction conduit at the leading edge of a blade type throttle valve when the latter is at its idle position, so as to operate in response to throttle position and in turn control a recycling valve in the bypass duct to effect controlled exhaust recycling in increasing amounts as the throttle valve opens from its idle to part load positions, and to reduce the exhaust recycling at both idle and wide open throttle positions.

10 Claims, 3 Drawing Figures

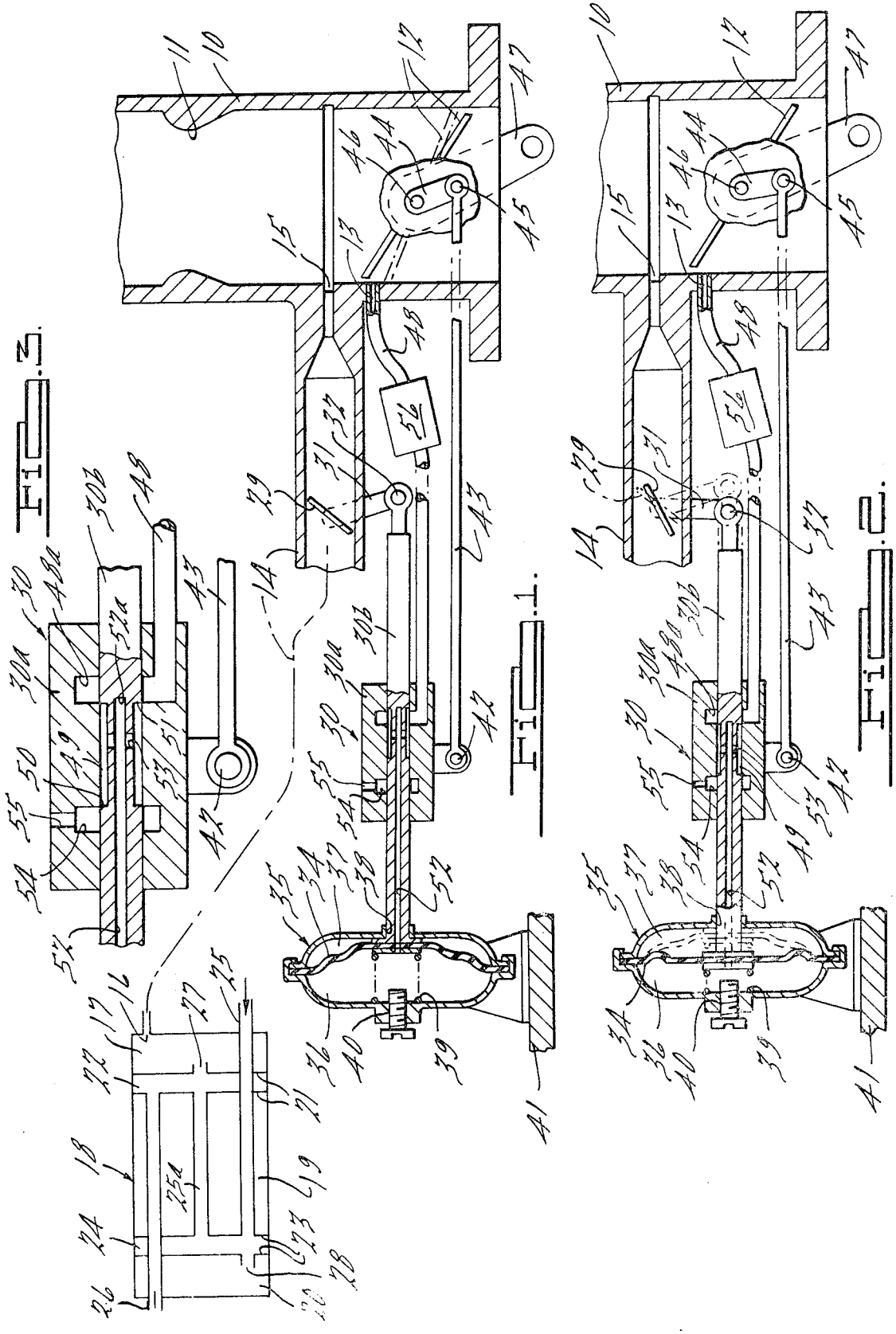

ENGINE EXHAUST RECIRCULATION

BACKGROUND AND SUMMARY OF THE INVENTION

In the prior art, numerous systems have been devised to recycle exhaust gas into the fuel-air induction system of an automobile engine for the purposes of pre-heating and vaporizing the incoming air-fuel mixture to facilitate its complete combustion in the combustion zone, for re-using the unignited or partially burned portions of the fuel which would otherwise pass out the exhaust pipe and into the atmosphere, and for reducing the oxides of nitrogen emitted from the exhaust system into the atmosphere. It has been found that approximately 15 percent exhaust gas recycling is required at moderate speeds to substantially reduce the nitrogen oxide content of the exhaust gases discharged into the atmosphere.

Although the prior art structures have had the desired effect of reducing the content of nitrogen oxides in the exhaust by reducing the maximum combustion temperature in consequence of diluting the fuel-air mixture with recycled exhaust gases during certain operating conditions of the engine, these structures have not been entirely satisfactory from the standpoints of both cost and operating efficiency and have been complicated by the desirability of reducing the recycling during conditions of both engine idling when nitrogen oxide emission is a minor problem and wide open throttle when maximum power is required, while progressively increasing the recycling of exhaust gases with increasing engine speed during cruising condition or with increasing engine load at part open throttle. The nitrogen oxide emission is a direct function of combustion temperature and for that reason is less critical during engine idling when the rate of fuel combustion and the consequent combustion temperature are minimal, and during wide open throttle conditions which are ordinarily of short duration.

In the usual gasoline or hydrocarbon fuel type engine, fuel combustion can take place at about 1,200°F. The formation of nitrogen oxides does not become particularly objectionable until the combustion temperature exceeds about 2,200°F., but the usual engine combustion temperature which increases with engine load or the rate of acceleration at any given speed frequently rises to about 2,500°F. It is known that the recycling of at least one-twentieth and not more than one-fourth of the total exhaust gases through the engine, depending on the load or power demand, will reduce the combustion temperature to less than 2,200°F. The desired result is usually obtained with the ordinary engine upon the recycling of about 15 percent of the total exhaust gases during partially open throttle as aforesaid.

An important object of this invention is to provide improved means for controlling the recirculation of a portion of the combustion products from the exhaust system to the inlet system of an automobile engine to overcome or avoid the problems and deficiencies of the prior art, as well as to achieve a number of important results including preheating and improved mixing and carburetion of the fuel-air mixture in the inlet header, the reduction of ice formation on the customary throttle blade, and the reduction of noxious nitrogen oxides in the exhaust.

Another and more specific object is to provide such an exhaust recycling system comprising a bypass duct which opens from a source of comparatively cool exhaust gases into the inlet induction conduit at a location upstream of the throttle valve and to control the flow of exhaust gases in the bypass duct in accordance with the throttle position and the pressure differential between the opposite ends of the bypass duct at the exhaust gas source and the inlet induction conduit.

In accordance with the foregoing, a recycling valve in the bypass duct is opened or closed upon opening or closing respectively of a conventional blade type throttle valve by virtue of a servo valve operably coupled with the throttle valve, recycling valve, and a pressure actuated device. The latter is responsive to the pressure in the induction conduit at a location immediately upstream of the leading edge of the throttle valve at the closed or idle position, so as to increase the recycling flow of exhaust gases as the throttle valve opens from its idle position and to decrease or completely stop the recycling flow when the throttle valve is at either its idle or wide open position.

The bypass duct and recycling valve are dimensional so that ordinarily more than 5 percent but less than approximately 25 percent and usually about 15 percent of the total exhaust gases will be conducted through the bypass duct when the throttle is partially open cruising the effective pressure differential between its ends corresponds to curising or part open throttle acceleration conditions.

In the above regard, within the range from idle to light or moderate load conditions, the total fluid flow through the recycling valve controlled bypass duct increases at any given engine speed with increasing engine load. For example, in a conventional automobile engine, the inlet conduit pressure downstream of the throttle varies roughly in the neighborhood of from one half atmosphere during idling to approximately one atmosphere at wide open throttle, while the exhaust conduit pressure simultaneously varies roughly from one to two atmospheres. These factors compensate for the tendency toward increasing combustion temperature with increasing load and result in a desirable increase in the effectiveness of the exhaust recycling flow through the bypass duct with increasing load or acceleration when the bypass duct is restricted by the recycling valve.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a schematic sectional view of an exhaust recycling system embodying the present invention, showing the servo valve in an intermediate position corresponding to partial opening of the throttle valve from its idle position but prior to operation of the pressure actuated member to restore the servo valve to its equilibrium position.

FIG. 2 is a view similar to FIG. 1, showing the servo valve in the equilibrium position after operation of the pressure actuated member.

FIG. 3 is an enlarged fragmentary sectional view of the servo valve showing the latter in the equilibrium position.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Referring to the drawings, a conventional automobile fuel inlet conduit 10 is illustrated having the customary fuel inducing venturi 11 and pivotal blade type throttle valve 12 downstream of the venturi. A vacuum sensing port 13 adjacent and immediately upstream of the leading or upstream edge of the throttle valve 12 opens into the inlet conduit 10 so as to be in the comparatively high pressure or atmospheric region when the throttle blade 12 is at its idle position shown in dotted lines. FIG. 1, and in a region of decreasing pressure or increasing vacuum when the throttle valve 12 progressively opens to a part load condition, FIG. 1. The port 13 may comprise or communicate with the usual ignition distributor vacuum advance port.

Comparatively warm exhaust gas from the engine is recycled into the inlet conduit 10 via a bypass duct 14, which opens into conduit 10 at an annular port 15 above the throttle valve 12 so as to aid in dispersion and evaporation of fuel droplets in the inlet air-fuel mixture by warming the mixture, and also to prevent throttle icing. The upstream end of duct 14 communicates at 16 with the engine exhaust system at a convenient location which preferably is a comparatively dead end chamber 17 at the forward end of a conventional muffler 18.

In the present instance a typical three-pass muffler 18 is shown partitioned to provide in addition to chamber 17, a central main chamber 19 and a rear chamber 20 by means of transverse gas passages 22 and 24 defined by paired transverse plates 21 and 23 respectively. The customary exhaust conduit 25 from the automobile engine enters the forward end of the muffler 18, passes directly through the chambers 17 and 19, and opens into the transverse passage 24. Exhaust gases entering via the conduit 25 flow transversely in passage 24 to an intermediate return flow passage 25a, then forwardly to the transverse passage 22, and then transversely in passage 22 to the tailpipe section 26 of the exhaust conduit. The latter extends from the passage 22 directly through chambers 19 and 20 to an exhaust outlet at the rear of the automobile. Opening into chambers 17 and 20 respectively are sound attenuating ports 27 and 28, the port 27 being preferably located out of alignment with the port 16 to prevent a direct passage of hot exhaust gases into the bypass duct 14. In accordance with conventional muffler construction, numerous sound attenuating foramina, not shown, may be provided in the exhaust conduits 25, 25a, and 26 to open into the otherwise dead gas chambers 17, 19 and 20.

In accordance with the structure described, chamber 17 is in communication with the exhaust gas system, but is out of the direct flow path. The exhaust gases in chamber 17 have an opportunity to cool sufficiently to precipitate lead contaminants, if any, which would otherwise clog the restricted path at the valve 29. Also the cooled exhaust gases, though still warm compared to the inlet fuel-air mixture in conduit 10, are appreciably heavier than the hotter exhaust gases in the exhaust pipe 25. A greater mass flow of the cooled exhaust gases will be recycled via duct 14, as compared to an equal volume flow of exhaust gases in exhaust duct 25, and the cooler temperature of the recycled exhaust gas will be at a more uniform temperature. Thus the accuracy of the control of the quantity of exhaust recycling flow is appreciably increased.

A pivotal blade type recycling valve 29 is located within the duct 14 to control the bypass flow of exhaust gases into conduit 10 in accordance with the position of throttle valve 12. Control of valve 29 is accomplished by means of a servo valve 30 comprising a first or outer ported spool valve element 30a and an inner tubular ported slide valve shaft or element 30b. One end of the valve element 30b is pivotally connected at 32 to a crank arm 31 keyed coaxially with recycling valve 29 to operate the latter upon longitudinal sliding movement of valve element 30b. The opposite end of valve element 30b extends through and is secured to a flexible member or diaphragm 34 which partitions a pressure actuation device 35 into a closed vacuum chamber 36 and an atmospheric chamber 37. The latter is vented by leakage to atomsphere via an opening 38 in chamber 37 through which the element 30b extends slidably. A biasing spring 39 within chamber 36 normally urges the diaphragm 34 rightward in a valve closing direction as described below. Leftward movement of the diaphragm 34 in a valve opening direction is adjustably limited by a screw threaded stop 40. The assembly of the device 35 is mounted at 41 on a fixed portion of the automobile.

The outer spool valve element 30a is pivotally connected at 42 to one end of a connecting link 43 having its opposite end pivotally connected at 45 to a crank arm 44, which in turn is keyed coaxially to the pivotal shaft 46 of the throttle valve 12 for pivoting in unison therewith. Also keyed coaxially to the shaft 46 is a typical throttle operating arm 47 controlled by pedal operation of the automobile driver.

A flexible hose 48 communicates at its opposite ends with the vacuum sensing port 13 and an annular port 48a formed in the inner surface of the valve element 30a coaxially around the valve shaft 30b. An annular recess 40 in the outer surface of shaft 30b spaces annular valve lands 50 and 51. The central bore or passage 52 in tubular shaft 30b opens leftwardly into the vacuum chamber 36 and terminates rightwardly at 52a, and opens radially via bore 53 into the opening provided by recess 49 between the lands 50 and 51. Leftward of land 50, when the servo valve 30 is at its equilibrium position shown in FIG. 3, is an annular vent recess 54 in the inner surface of spool valve 30a coaxially with shaft 30b. The vent recess 54 opens radially to the atmosphere at port 55.

At the equilibrium position shown in FIGS. 2 and 3, the annular lands 50 and 51 in sliding and fluid sealing contact with the inner surface of valve element 30a close annular ports 54 and 48a and thereby block communication between vacuum sensing port 13 and vacuum chamber 36. When spool valve element 30a moves leftward with respect to slide valve 30b from the equilibrium position of FIG. 3, as for example upon opening of throttle valve 12 from its idle position, shown in dotted lines, FIG. 1, communication will be established between port 13 and the chamber 36 via conduit 48, annular recess 49, port 53, and central passage 52. Also upon opening of throttle valve 12 to the FIG. 1 position, the pressure at port 13 will be reduced. The vacuum thus created in chamber 36 will move diaphragm 34 and slide valve element 30b leftward in a valve opening operation against the force of biasing spring 39 to the position illustrated in FIG. 2, thereby to close ports 54 and 48a and re-establish a new equilibrium position of the servo valve 30. Simultaneously the leftward valve opening movement of valve element 30b will pivot the recycling valve 29 in an opening direction to initiate or increase the flow of bypass exhaust gases, as the case may be, into conduit 10 in accordance with the position of throttle valve 12 and the pressure differential between the ends of duct 14, as determined by engine load.

Upon partial closing of the throttle valve 12 from any open position, valve element 30a will be moved rightward from the previously established equilibrium position, thereby to open atmosphere vent port 54 to chamber 36 and cause diaphragm 34 and slide valve element 30b to follow the rightward movement of element 30a and establish a new equilibrium position determined by the new throttle position. By the construction shown, no appreciable pedal force need be exerted by the automobile operator to control the recycling valve 29.

Upon continued opening of throttle valve 12 to adjacent its wide open position, the pressure at port 13 will gradually increase to a predetermined limiting pressure that is unable to overcome the rightward biasing force of spring 39, i.e. to approximately 4 inches or 5 inches of mercury below atmospheric pressure, whereupon the diaphragm 34 with the attached slide valve 30b will be moved rightward by the biasing spring 39 to close valve 29. Similarly at the idle position of throttle valve 12, the pressure at port 13 will be substantially atmospheric and recycling valve 29 will be closed.

If desired, the pressure communication between port 13 and chamber 36 may also be controlled by a temperature responsive valve 56 in conduit 48, operable to completely close the latter until the engine attains a desired operating temperature.

I claim:

1. In an internal combustion engine having an inlet conduit, throttle means including a throttle valve in said inlet conduit movable between idle and load positions, a vacuum sensing port opening into said inlet conduit at a location subject to decreasing pressure upon opening movement of said throttle valve from said idle position to a part load position, an exhaust conduit, a bypass duct connecting said exhaust and inlet conduits for recycling exhaust gases into said inlet conduit, a recycling valve for controlling the opening of said bypass duct, pressure actuated means responsive to decreasing pressure for valve opening operation, duct means for conducting the pressure at said vacuum sensing port to said pressure actuated means, servo valve means in said duct means for selectively restricting the latter, interconnecting means operably interconnecting said pressure actuated means, throttle means, and recycling valve with said servo valve means for operating the latter to decrease the restriction in said duct means upon said opening movement of said throttle valve and for increasing said restriction upon said valve opening operation of said pressure actuated means, said interconnecting means including means for actuating said recycling valve to increase the opening of said bypass duct upon said valve opening operation of said pressure actuated means.

2. In the combination according to claim 1 said pressure actuated means including biasing means for yieldingly urging valve closing operation of said pressure actuated means, and said interconnecting means including means for actuating said recycling valve to decrease the opening of said bypass duct and for decreasing said restriction between said pressure actuated means and vacuum sensing port upon said valve closing operation.

3. In the combination according to claim 2, said servo valve means including means for venting said pressure actuated means to atmosphere upon predetermined valve opening operation of the latter.

4. In the combination according to claim 1, said vacuum sensing port also opening into said inlet conduit at a location subject to increasing pressure upon opening movement of said throttle valve adjacent its wide open position, said pressure actuated means including means for effecting valve closing operation responsive to a predetermined pressure approximating the pressure at said vacuum sensing port when said throttle valve is moved to either said idle position or to said wide open position, and said interconnecting means including means for actuating said recycling valve to close said bypass duct upon said valve closing operation of said pressure actuated means.

5. In the combination according to claim 4, said pressure actuated means including means responsive to all presures less than said predetermined pressure for effecting said valve opening operation.

6. In the combination according to claim 5, said throttle valve comprising a blade type valve pivotal within said inlet conduit and having an upstream edge at said idle position adjacent said vacuum sensing port and being progressively movable upstream within said inlet conduit upon pivotal opening of said throttle valve from said idle position.

7. In the combination according to claim 5, said servo valve means including means for venting said pressure actuated means to atmosphere upon predetermined valve opening operation of the latter.

8. In the combination according to claim 1, said pressure actuated means including a pressure actuated member, said duct means being effective to conduct the pressure at said vacuum sensing port to said member for moving the latter in an opening direction when said pressure decreases, said pressure actuated means also including biasing means for moving said member in a closing direction when said pressure increases, said interconnecting means including means operably connecting said member and recycling valve for opening or closing said bypass duct upon movement of said member in said opening or closing direction respectively, said servo valve means comprising first and second valve elements relatively movable in a servo opening operation for decreasing the restriction in said duct means and relatively movable in a servo closing operation for increasing said restriction and for venting said member to atmosphere, said interconnecting means also including means operably connecting said throttle valve with said first valve element to effect the relative servo opening or closing operation of said valve elements upon opening or closing movement respectively of said throttle valve, and said interconnecting means including means operably connecting said member and second valve element to effect said relative servo closing or opening operation upon respective movement of said member in said opening or closing direction.

9. In the combination according to claim 8, said throttle valve comprising a blade type valve pivotal within said inlet conduit and having an upstream edge at said idle position adjacent said vacuum sensing port and being progressively movable upstream within said inlet conduit upon pivotal opening of said throttle valve from said idle position.

10. In the combination according to claim 9, said vacuum sensing port also opening into said inlet conduit at a location subject to increasing pressure upon opening movement of said throttle valve adjacent its wide open position, said pressure actuated member being movable in said closing direction responsive to pressures greater than a predetermined pressure approximating the pressure at said vacuum sensing port when said throttle valve is proximate either said idle position or said wide open position, and being movable in said opening direction responsive to all pressures less than said predetermined pressure.

* * * * *